United States Patent
Wang et al.

(10) Patent No.: US 10,484,122 B2
(45) Date of Patent: Nov. 19, 2019

(54) OPTICAL ADD/DROP MULTIPLEXER AND CONTROL METHOD THEREOF, AND TRANSCEIVER

(71) Applicant: HUAWEI TECHNOLOGIES CO., LTD., Shenzhen, Guangdong (CN)

(72) Inventors: Jing Wang, Shenzhen (CN); Ning Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/251,463

(22) Filed: Jan. 18, 2019

(65) Prior Publication Data

US 2019/0199463 A1 Jun. 27, 2019

Related U.S. Application Data

(63) Continuation of application No. PCT/CN2016/090994, filed on Jul. 22, 2016.

(51) Int. Cl.
*H04J 14/02* (2006.01)
*H04B 10/2519* (2013.01)
*H04B 10/40* (2013.01)

(52) U.S. Cl.
CPC ...... *H04J 14/0209* (2013.01); *H04B 10/2519* (2013.01); *H04B 10/40* (2013.01); *H04J 14/021* (2013.01)

(58) Field of Classification Search
CPC .. H04J 14/021; H04J 14/0209; H04J 14/0205; H04J 14/0201; G02B 6/29383;
(Continued)

(56) References Cited

U.S. PATENT DOCUMENTS 6,792,211 B1 * 9/2004 Chang ................ G02B 6/29364
385/24
7,181,094 B2  2/2007 Noguchi et al.
(Continued)

FOREIGN PATENT DOCUMENTS

CN    1403864 A    3/2003
CN    1750446 A    3/2006
(Continued)

OTHER PUBLICATIONS

International Search Report and Written Opinion issued in International Application No. PCT/CN2016/090994 dated Mar. 16, 2017, 19 pages.
(Continued)

*Primary Examiner* — Hibret A Woldekidan
(74) *Attorney, Agent, or Firm* — Fish & Richardson P.C.

(57) ABSTRACT

Embodiments of the present invention provide an optical add/drop multiplexer, including a plurality of tunable optical add/drop multiplexers T-OADMs. Each T-OADM includes a second wavelength control unit and two grating-assisted filters GAFs. The second wavelength control unit is connected to a second GAF. A drop port of a first GAF is connected to an input port of the second GAF. An add port of the first GAF is connected to an output port of the second GAF. An input port of the first GAF receives light waves of a plurality of wavelengths. The first GAF transmits a first light wave to the input port of the second GAF through the drop port of the first GAF. The second wavelength control unit changes a dropped spectrum of the second GAF based on first amplitude of wavelength shift, to obtain a first light wave response.

13 Claims, 8 Drawing Sheets

(58) Field of Classification Search
CPC ............ G02B 6/29395; G02B 6/29382; G02B 2006/12107; G02B 2006/12109; G02F 2203/585; H04B 10/2519; H04B 10/40; H04Q 2011/0009
USPC .................................. 398/83, 84, 85, 87, 135
See application file for complete search history.

(56) References Cited

U.S. PATENT DOCUMENTS

| | | | |
|---|---|---|---|
| 7,248,758 B2* | 7/2007 | Xia | G02B 6/29361 385/15 |
| 7,406,262 B2* | 7/2008 | Nakagawa | H04B 10/572 398/83 |
| 7,437,075 B2* | 10/2008 | Doerr | G02B 6/12007 398/45 |
| 8,064,769 B2* | 11/2011 | Galli | H04J 14/021 398/83 |
| 8,532,446 B2 | 9/2013 | Zheng et al. | |
| 8,983,298 B2* | 3/2015 | Shukunami | H04J 14/0201 398/83 |
| 9,071,378 B2* | 6/2015 | Hoshida | H04J 14/02 |
| 9,410,826 B2* | 8/2016 | Bastianini | G01D 5/35364 |
| 2002/0006249 A1 | 1/2002 | Augustsson | |
| 2004/0136717 A1 | 7/2004 | Zhang et al. | |
| 2004/0213507 A1 | 10/2004 | Liu | |
| 2005/0281558 A1* | 12/2005 | Wang | H04J 14/0209 398/85 |
| 2012/0189249 A1 | 7/2012 | Lu et al. | |
| 2012/0207477 A1* | 8/2012 | Takeguchi | H04J 14/0204 398/79 |
| 2013/0142517 A1* | 6/2013 | Sakharov | H04J 14/0208 398/85 |
| 2016/0315697 A1* | 10/2016 | Breukelaar | H04J 14/0212 |
| 2016/0352448 A1* | 12/2016 | Zhou | H04J 14/0221 |

FOREIGN PATENT DOCUMENTS

| | | |
|---|---|---|
| CN | 1845484 A | 10/2006 |
| CN | 101013990 A | 8/2007 |
| CN | 101227247 A | 7/2008 |
| CN | 103023599 A | 4/2013 |

OTHER PUBLICATIONS

Chinese Search Report issued in Chinese Application No. 201680079941 dated Mar. 18, 2019, 12 pages.
Extended European Search Report issued in European Application No. 16909255.8 dated Jul. 8, 2019, 10 pages.

* cited by examiner

OPTICAL ADD/DROP MULTIPLEXER AND CONTROL METHOD THEREOF, AND TRANSCEIVER

CROSS-REFERENCE TO RELATED APPLICATIONS

This application is a continuation of International Application No. PCT/CN2016/090994, filed on Jul. 22, 2016, the disclosure of which is hereby incorporated by reference in its entirety.

TECHNICAL FIELD

The present invention relates to the field of optical communications, and in particular, to a tunable optical add/drop multiplexer and a control method thereof, and a transceiver using the optical add/drop multiplexer.

BACKGROUND

An optical add/drop multiplexer (OADM) is an important filtering device in a current optical network, and plays an important role in developing a high-speed, large-capacity, and transparent communications network. A silicon photonics technology is a most popular optoelectronic integration technology in the industry over the past decade. In the technology, an existing microelectronic complementary metal-oxide-semiconductor (CMOS) process line and low-cost silicon materials can be fully used, to implement a wide variety of optoelectronic functional devices, for example, an optical add/drop multiplexer implemented by using a silicon-based microring scheme or an optical add/drop multiplexer implemented by using a silicon-based arrayed waveguide grating. However, a bandwidth of the optical add/drop multiplexer in the foregoing methods is untunable.

A growing quantity of new communication services are increasing people's requirements for network bandwidth. Compared with a conventional service, a new service usually has a higher dynamic characteristic and is unpredictable, so that a physical layer of a transport network needs to be more flexible. However, the bandwidth of the optical add/drop multiplexer in a common method is untunable, and this already fails to satisfy a requirement for system flexibility.

SUMMARY

Embodiments of the present invention provide an optical add/drop multiplexer, a control method for an optical add/drop multiplexer, and a transceiver using the optical add/drop multiplexer, to change a channel bandwidth, improve system flexibility, and adapt to a plurality of service requirements of a system.

According to a first aspect, an embodiment of the present invention provides an optical add/drop multiplexer, including a plurality of tunable optical add/drop multiplexers (T-OADM). Each T-OADM includes an input port, an output port, a drop port, and an add port. The plurality of T-OADMs are connected one by one, and an output port of a previous T-OADM is connected to an input port of a current T-OADM. Each T-OADM includes a second wavelength control unit and two grating-assisted filters GAFs, and the second wavelength control unit is connected to a second GAF. The first GAF includes an input port, an output port, a drop port, and an add port. The second GAF includes an input port, an output port, a drop port, and an add port. The drop port of the first GAF is connected to the input port of the second GAF. The add port of the first GAF is connected to the output port of the second GAF. A specific working process of the optical add/drop multiplexer is as follows: For light waves of a plurality of wavelengths from a line, the plurality of light waves enter the optical add/drop multiplexer from an input (input) port. The input port of the first GAF of a first T-OADM receives the light waves of a plurality of wavelengths, and the light waves of a plurality of wavelengths include a first light wave. The first GAF transmits the first light wave to the input port of the second GAF through the drop port of the first GAF. The second wavelength control unit changes a dropped spectrum of the second GAF based on first amplitude of wavelength shift, to obtain a first light wave response. The drop port of the second GAF outputs a first target light wave of a first target bandwidth, where the target bandwidth is an overlapping spectral linewidth of the first light wave and the first light wave response.

In this embodiment of the present invention, dropping is performed twice by disposing two GAFs. The first GAF performs dropping for the first time to obtain the first light wave, and the second GAF performs dropping for the second time and changes the dropped spectrum of the second GAF, to obtain the first light wave response. Therefore, the first light wave and the first light wave response have an overlapping spectral line, and a bandwidth of a light wave that is finally output by the second GAF is changed. Changing a channel bandwidth may greatly improve system flexibility, to adapt to a plurality of service requirements of a system.

In a possible implementation, the second GAF transmits the second light wave to the add port of the first GAF through the output port, where the second light wave is a remaining light wave other than the first target light wave in the first light wave. The output port of the first GAF outputs the second light wave.

In this embodiment of the present invention, some light waves that are not dropped may return to the first GAF and are output through the output port of the first GAF.

In a possible implementation, bandwidth tuning during adding and that during dropping are opposite to each other, but have a same principle. The add port of the second GAF receives a fourth light wave, where the fourth light wave is the same as the first light wave. The second GAF transmits the fourth light wave from the output port to the add port of the first GAF. The first wavelength control unit changes an added spectrum of the first GAF based on the first amplitude of wavelength shift, to obtain a fourth light wave response. The output port of the first GAF outputs a second target light wave of the first target bandwidth, where the first target bandwidth is an overlapping spectral linewidth of the fourth light wave and the fourth light wave response. In this embodiment of the present invention, a bandwidth during adding is tuned according to a service requirement, so that system flexibility is greatly improved.

In a possible implementation, the T-OADM further includes a first wavelength control unit, and the first wavelength control unit is connected to the first GAF. The first wavelength control unit and the second wavelength control unit each change dropped spectrums of their corresponding GAFs based on second amplitude of wavelength shift, to tune a passband center wavelength, where a passband center wavelength of the first GAF is the same as a passband center wavelength of the second GAF. A center wavelength during dropping is tuned: A light wave whose wavelength is the same as the passband center wavelength is transmitted to the input port of the second GAF through the drop port of the first GAF, and is output from the drop port of the second GAF. Alternatively, a center wavelength during adding is tuned: A light wave whose wavelength is the same as the passband center wavelength is transmitted to the add port of the first GAF through the output port of the second GAF, and is output from the output port of the first GAF.

In this embodiment of the present invention, a wavelength control unit controls a passband center wavelength of a GAF, so that passband center wavelengths of two GAFs are the same. A light wave whose length is the same as the passband center wavelengths of the two GAFs is output from the drop port of the second GAF, or is output from the output port of the first GAF during adding, so that the center wavelength is tuned, and system flexibility is improved.

In a possible implementation, the optical add/drop multiplexer provided in this embodiment of the present invention may further tune a center wavelength of a light wave, and then tune a bandwidth. The T-OADM includes a first wavelength control unit, and the first wavelength control unit is connected to the first GAF. First, the first wavelength control unit tunes a passband wavelength of the first GAF, and the first wavelength control unit changes a dropped spectrum of the first GAF based on second amplitude of wavelength shift. The first GAF transmits the fifth light wave to the input port of the second GAF through the drop port, where the light waves of a plurality of wavelengths include the fifth light wave. Then, bandwidth tuning is performed. The second wavelength control unit changes the dropped spectrum of the second GAF based on third amplitude of wavelength shift, to obtain a fifth light wave response, where the third amplitude is different from the second amplitude. The drop port of the second GAF outputs a third target light wave of a second target bandwidth, where the second target bandwidth is an overlapping spectral linewidth of the fifth light wave and the fifth light wave response.

In a possible implementation, the first GAF includes a first grating-assisted directional coupler, the first grating-assisted directional coupler includes two fiber Bragg grating waveguides, a first end of a first fiber Bragg grating waveguide is the input port of the GAF, a second end of the first fiber Bragg grating waveguide is the output port of the first GAF, a first end of the second fiber Bragg grating waveguide is the drop port of the first GAF, and a second end of the second fiber Bragg grating waveguide is the add port of the first GAF. Alternatively, the first GAF includes a first multimode interference coupler and a second multimode interference coupler, the first multimode interference coupler and the second multimode interference coupler are connected by using two fiber Bragg grating waveguides, a first port of the first multimode interference coupler is the input port of the first GAF, a second port of the first multimode interference coupler is the drop port of the first GAF, a first port of the second multimode interference coupler is the output port of the first GAF, and a second port of the second multimode interference coupler is the add port of the first GAF.

In a possible implementation, the second GAF includes a third multimode interference coupler and a fourth multimode interference coupler, the third multimode interference coupler and the fourth multimode interference coupler are connected by using two fiber Bragg grating waveguides, a first port of the third multimode interference coupler is the input port of the second GAF, a second port of the third multimode interference coupler is the drop port of the second GAF, a first port of the fourth multimode interference coupler is the output port of the second GAF, and a second port of the fourth multimode interference coupler is the add port of the second GAF. Alternatively, the second GAF includes a second grating-assisted directional coupler, the second grating-assisted directional coupler includes two fiber Bragg grating waveguides, a first end of a third fiber Bragg grating waveguide is the input port of the GAF, a second end of the third fiber Bragg grating waveguide is the output port of the second GAF, a first end of the fourth fiber Bragg grating waveguide is the drop port of the second GAF, and a second end of the fourth fiber Bragg grating waveguide is the add port of the second GAF.

According to a second aspect, an embodiment of the present invention provides a control method for an optical add/drop multiplexer, where the control method is applied to the optical add/drop multiplexer provided in the first aspect, the optical add/drop multiplexer includes a plurality of tunable optical add/drop multiplexers T-OADMs, the plurality of T-OADMs are connected one by one, each T-OADM includes two wavelength control units and two grating-assisted filters GAFs, a first wavelength control unit is connected to a first GAF, a second wavelength control unit is connected to a second GAF, a drop port of the first GAF is connected to an input port of the second GAF, and an add port of the first GAF is connected to an output port of the second GAF.

The control method includes:

receiving, by an input port of the first GAF of a first T-OADM, light waves of a plurality of wavelengths, where the light waves of a plurality of wavelengths include a first light wave; transmitting, by the first GAF, the first light wave to the input port of the second GAF through the drop port; changing, by the second wavelength control unit, a dropped spectrum of the second GAF based on target amplitude of wavelength shift, to obtain a first light wave response; and outputting, by a drop port of the second GAF, the first target light wave of a first target bandwidth, where the first target bandwidth is an overlapping spectral linewidth of the first light wave and the first light wave response.

In a possible implementation, after the outputting, by a drop port of the second GAF, a target light wave of a target bandwidth, the method further specifically includes: transmitting, by the second GAF, the second light wave to the add port of the first GAF through the output port, where the second light wave is a remaining light wave other than the first target light wave in the first light wave; and outputting, by an output port of the first GAF, the second light wave.

In a possible implementation, after the outputting, by a drop port of the second GAF, a target light wave of a target bandwidth, the method may be specifically: receiving, by an add port of the second GAF, a fourth light wave, where the fourth light wave is the same as the first light wave; transmitting, by the second GAF, the fourth light wave from the output port to the add port of the first GAF; changing, by the first wavelength control unit, an added spectrum of the first GAF based on the target amplitude of wavelength shift, to obtain a fourth light wave response; and outputting, by the output port of the first GAF, a second target light wave of the first target bandwidth, where the first target bandwidth is an overlapping spectral linewidth of the fourth light wave and the fourth light wave response.

In a possible implementation, a center wavelength during adding/dropping may further be tuned. The method further includes: each changing, by the first wavelength control unit and the second wavelength control unit, dropped spectrums of their corresponding GAFs based on second amplitude of wavelength shift, where a passband center wavelength of the first GAF is the same as a passband center wavelength of the second GAF. During dropping, center wavelength tuning includes: transmitting a light wave whose length is the same as the passband center wavelength to the input port of the second GAF through the drop port of the first GAF, and outputting the light wave from the drop port of the second GAF. Alternatively, during adding, center wavelength tuning includes: transmitting a light wave whose length is the same as the passband center wavelength to the add port of the first GAF through the output port of the second GAF, and outputting the light wave from an output port of the first GAF.

In a possible implementation, a center wavelength may be tuned first, and then a bandwidth is tuned. The light waves of a plurality of wavelengths include a fifth light wave, and the method may be specifically: changing, by the first wavelength control unit, a dropped spectrum of the first GAF based on second amplitude of wavelength shift; transmitting, by the first GAF, the fifth light wave to the input port of the second GAF through the drop port; changing, by the second wavelength control unit, the dropped spectrum of the second GAF based on third amplitude of wavelength shift, to obtain a fifth light wave response, where the third amplitude is different from the second amplitude; and outputting, by a drop port of the second GAF, a third target light wave of a second target bandwidth, where the second target bandwidth is an overlapping spectral linewidth of the fifth light wave and the fifth light wave response.

According to a third aspect, an embodiment of the present invention provides a transceiver, including at least one laser, at least one modulator, at least one detector, and the optical add/drop multiplexer according to the foregoing first aspect, where the laser is connected to the modulator, the modulator is connected to an add port of a tunable optical add/drop multiplexer unit, and the detector is connected to a drop port of the optical add/drop multiplexer.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if any) are intended to distinguish between similar objects but do not necessarily indicate a specific order or sequence. It should be understood that the data used in such a way is interchangeable in proper circumstances, so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

An embodiment of the present invention provides an optical add/drop multiplexer. The optical add/drop multiplexer (OADM) is one of key network elements in a wavelength division multiplexing (WDM) optical network. WDM is a technology in which optical signals of a plurality of wavelengths are transmitted in a single optical fiber simultaneously. A basic principle of the WDM technology is as follows: At a transmit end, optical signals of different wavelengths are multiplexed and coupled to a same optical fiber over an optical cable line for transmission, and at a receive end, an optical signal of a combined wavelength is demultiplexed and is further processed, to recover original signals which are then transmitted to different terminals.

Figure 1:
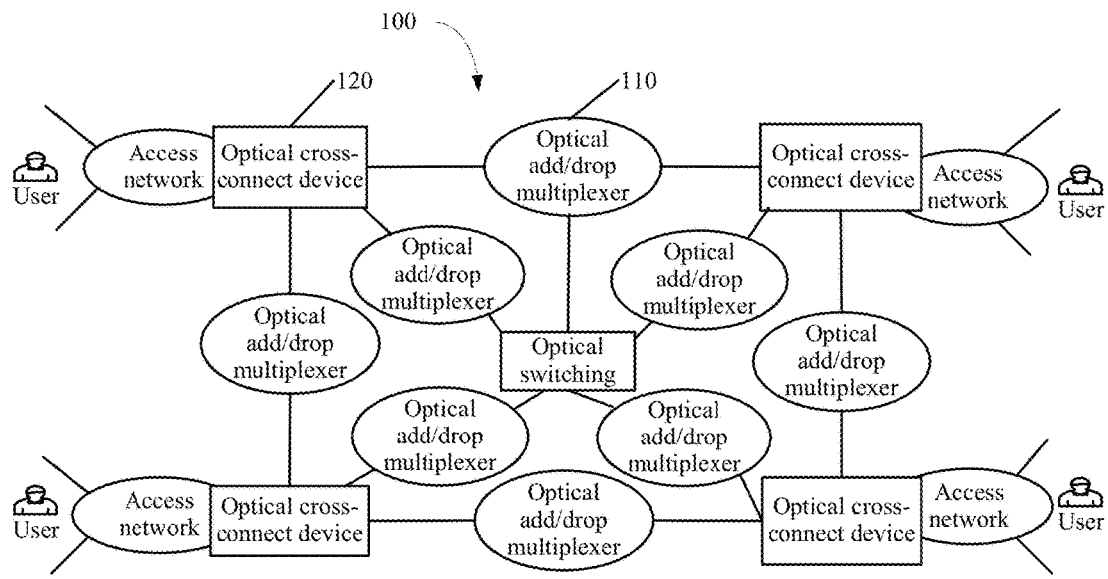
FIG. 1 is an architectural diagram of an optical network according to an embodiment of the present invention.

For ease of understanding, referring to FIG. 1, FIG. 1 is an architectural diagram of an optical network 100 and an architectural diagram of a WDM all-optical network connected by using an optical add/drop multiplexer 110 and an optical cross-connect (OXC) device 120. The optical add/drop multiplexer 110 allows signals of different wavelengths in different optical networks to be added/dropped in a multiplexing manner at different locations. The OXC device 120 allows different networks to be combined dynamically and wavelength resources to be allocated as required, to implement a wider range of network interconnection. Optical adding/dropping may be performed at any time as required between two optical cross-connect nodes or optical switch nodes. The OXC device 120 transmits, to an access network, information that needs to be dropped by the node, and other information that does not need to be processed by the node is directly transmitted by the node through an optical channel, thereby greatly improving efficiency of processing information by the node. It should be noted that the optical network 100 to which the optical add/drop multiplexer is applied is merely used as an example to describe the present invention, but is not construed as a limitation to a network to which the optical add/drop multiplexer is applied. A specific network application scenario is not limited in the present invention.

Figure 2A:
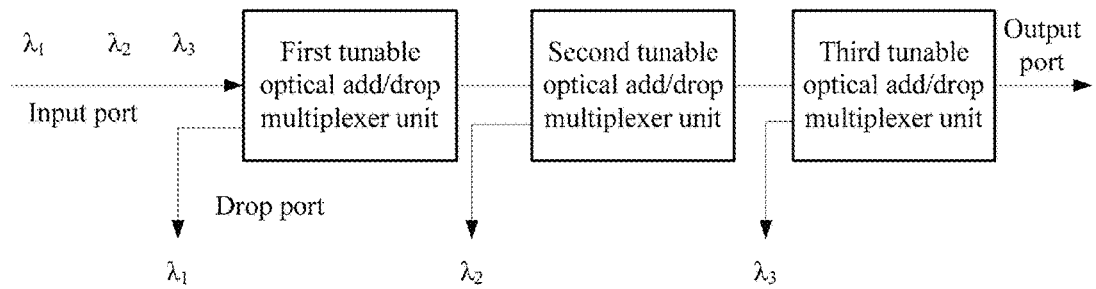
FIG. 2*a* is a schematic diagram of a dropping principle of an optical add/drop multiplexer according to an embodiment of the present invention.
Figure 2B:
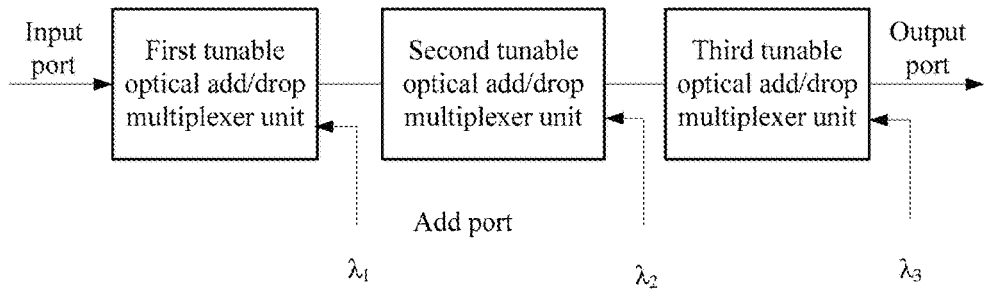
FIG. 2*b* is a schematic diagram of an adding principle of an optical add/drop multiplexer according to an embodiment of the present invention.

Referring to FIG. 2a and FIG. 2b, FIG. 2a and FIG. 2b are schematic diagrams of a principle of an OADM according to an embodiment of the present invention. FIG. 2a is a schematic diagram of a dropping principle of the OADM, and FIG. 2b is a schematic diagram of an adding principle of the OADM. The OADM node may be indicated by using a four-port model, and four ports are respectively an input port, an output port, a drop port, and an add port. The OADM includes a plurality of tunable optical add/drop multiplexers (T-OADM), and each T-OADM also includes an input port, an output port, a drop port, and an add port 240. The plurality of T-OADMs are connected one by one, and an output port of a previous T-OADM is connected to an input port of a current T-OADM. The OADM includes at least one of the following functions: dropping a required wavelength channel, multiplexing an added wavelength channel, and performing bandwidth tuning for a dropped wavelength channel and an added wavelength channel. A specific working process of the OADM is as follows: WDM signals from a line include light waves of a plurality of wavelengths, and the plurality of light waves enter the OADM from an input (input) port. According to a service requirement, in the light waves of a plurality of wavelengths, a required wavelength channel is output selectively from a drop (drop) port, and a bandwidth of the wavelength channel may be tuned, to improve system flexibility; accordingly, a required wavelength channel is input from an add (add) port. Another wavelength channel unrelated to a local node may be multiplexed with an added wavelength channel by using the OADM and then output from the output (output) port of the OADM. It should be noted that three T-OADMs are used as examples to describe FIG. 2a and FIG. 2b but are not construed as a limitation. In actual application, a specific quantity of T-OADMs included in the OADM is not limited.

Figure 3:
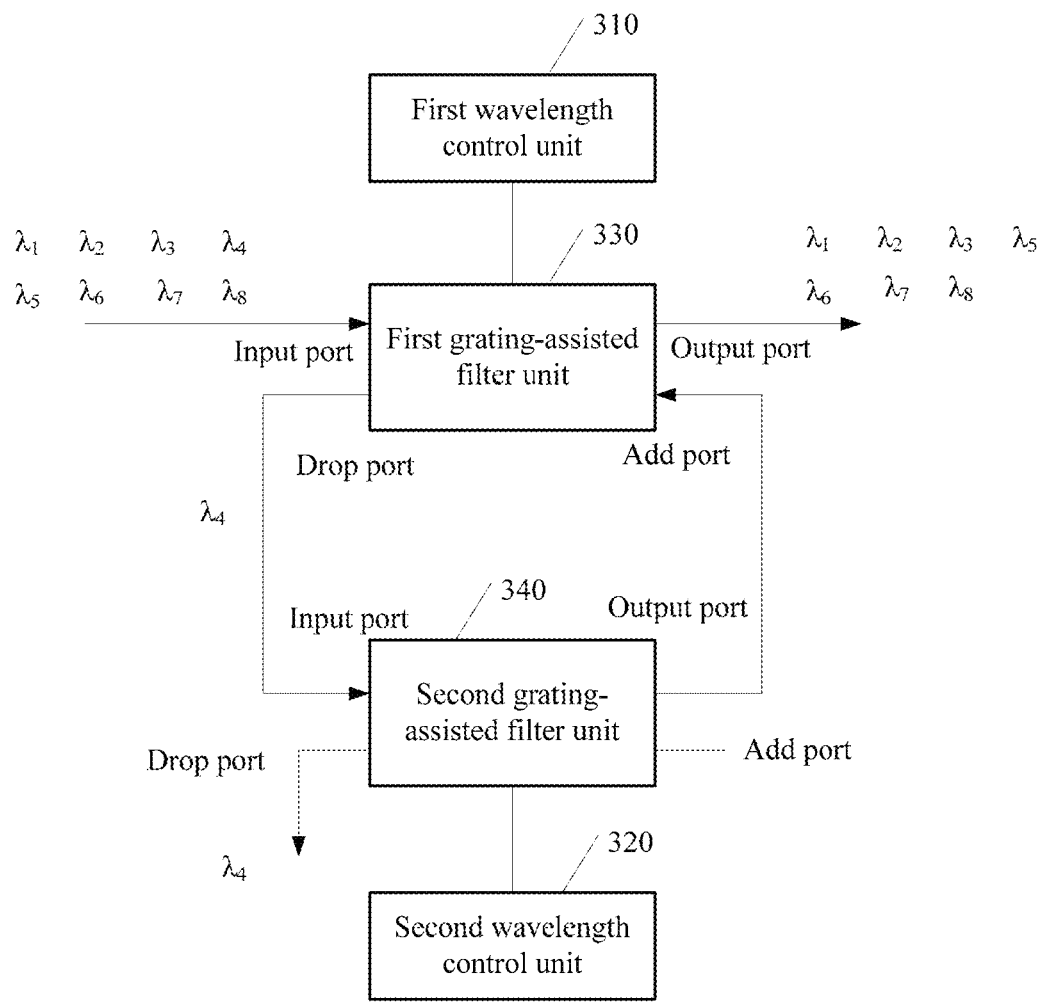
FIG. 3 is a schematic structural diagram of an embodiment of a tunable optical add/drop multiplexer unit according to an embodiment of the present invention.

The following specifically describes an optical add/drop multiplexer. The optical add/drop multiplexer includes a plurality of T-OADMs connected one by one. Therefore, in this embodiment of the present invention, a first T-OADM is specifically described. The first T-OADM is one of the plurality of T-OADMs included in the OADM. Referring to FIG. 3, FIG. 3 is a schematic structural diagram of a T-OADM. An embodiment of the T-OADM in this embodiment of the present invention includes the following:

Each T-OADM includes two wavelength control units and two grating-assisted filter (Grating-assisted filter, GAF for short) units. A first wavelength control unit 310 is connected to a first GAF 330, and a second wavelength control unit 320 is connected to a second GAF 340. Each wavelength control unit is configured to independently control a passband center wavelength of a GAF connected to the wavelength control unit.

The first GAF 330 includes an input port, an output port, a drop port, and an add port. The second GAF 340 includes an input port, an output port, a drop port, and an add port.

The drop port of the first GAF 330 is connected to the input port of the second GAF, and the add port of the first GAF 330 is connected to the output port of the second GAF 340. Therefore, an input port of the entire T-OADM is the input port of the first GAF 330, an output port of the entire T-OADM is the output port of the first GAF 330, an add port of the entire T-OADM is the add port of the second GAF 340, and a drop port of the entire T-OADM is the drop port of the second GAF 340.

Referring to FIG. 3, the input port of the first GAF 330 receives light waves of a plurality of wavelengths. For example, an example in which a list of light waves of eight wavelengths enter the T-OADM is used. Center wavelengths of the eight light waves are respectively $\lambda_1$, $\lambda_2$, $\lambda_3$, $\lambda_4$, $\lambda_5$, $\lambda_6$, $\lambda_7$, and $\lambda_8$, where $\lambda_1$ to $\lambda_8$ represent wavelengths of all signals, and there is a same interval of $\Delta\lambda$ between every two wavelengths. The light waves of a plurality of wavelengths first enter the first GAF 330 after passing through the input port of the first GAF, and dropping may occur for the first time. A light wave that is dropped for the first time is a first light wave, and a spectrum of the first light wave depends on an optical design parameter of the first GAF, for example, a grating period, a duty cycle, or a profile. If a center wavelength of a signal that is dropped for the first time is $\lambda_4$, light waves of seven wavelengths $\lambda_1$, $\lambda_2$, $\lambda_3$, $\lambda_5$, $\lambda_6$, $\lambda_7$, and $\lambda_8$ are directly transmitted to the output port from the input port of the first GAF 330.

The first light wave enters the second GAF 340 through the input port of the second GAF 340, and dropping occurs for the second time. A dropped spectrum depends on an optical design parameter of the second GAF, for example, a grating period, a duty cycle, or a profile.

Figure 4:
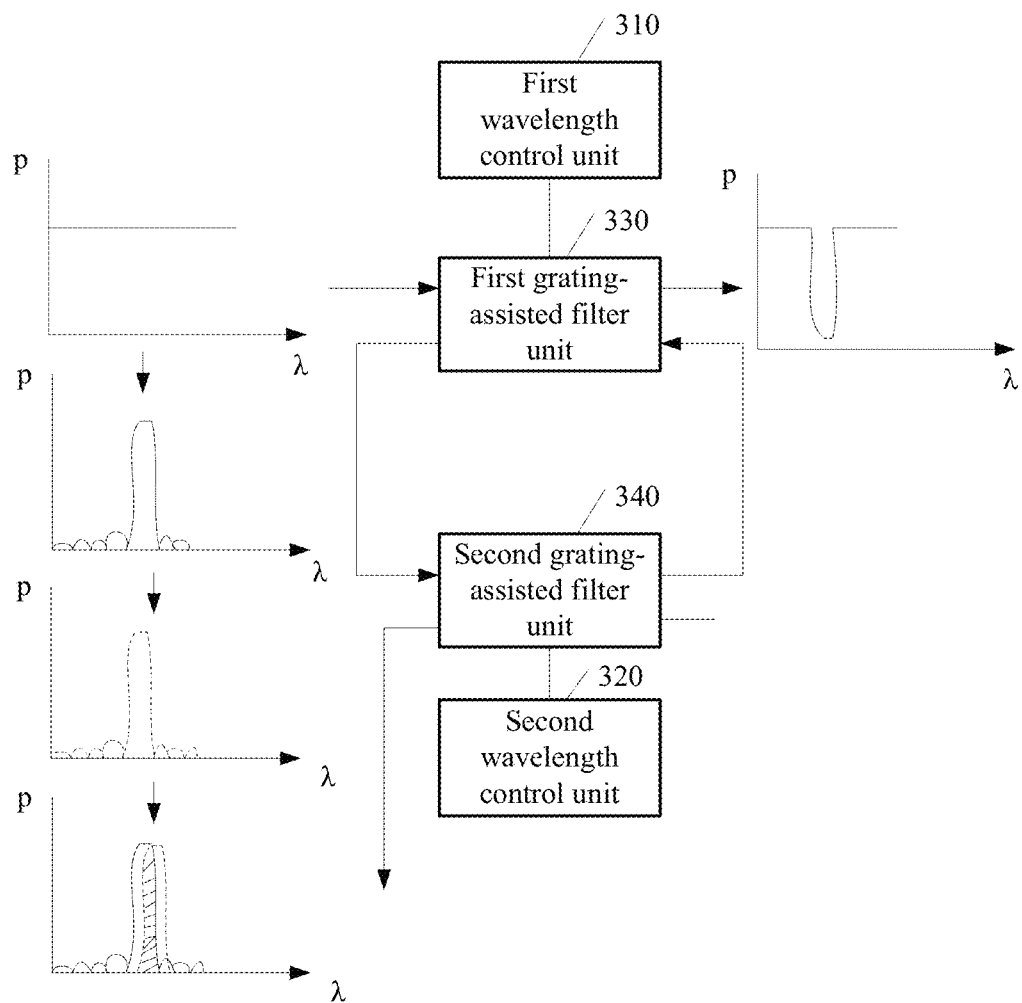
FIG. 4 is a schematic diagram of performing dropping by a tunable optical add/drop multiplexer according to an embodiment of the present invention.

The following takes dropping as an example for description. Referring to FIG. 4, FIG. 4 is a schematic diagram of dropping. A wavelength control unit performs thermo-optic tuning or electro-optic tuning for a GAF by applying a voltage to a silicon waveguide. The second wavelength control unit 320 changes a dropped spectrum of the second GAF 340 based on first amplitude of wavelength shift, and a light wave response of the second wavelength control unit 320 is a first light wave response. It may be understood that the first wavelength control unit 320 keeps a voltage unchanged, and a passband center wavelength of the first GAF is not changed. The second wavelength control unit 320 controls a voltage to change, for example, increases the voltage. After the voltage is increased, a passband center wavelength of the second GAF 340 is changed. The first light wave response may be understood as a spectrum obtained by after the spectrum of the first light wave is horizontally moved by an offset. A spectrum shape of the first light wave is not changed after wavelength shift, and only a center wavelength is changed. It should be noted that the first amplitude is less than a bandwidth of the first light wave, so that the first light wave and the first light wave response can have an overlapping spectral line.

The drop port of the second GAF 340 outputs a first target light wave of a first target bandwidth, where the first target bandwidth is an overlapping spectral linewidth of the first light wave and the first light wave response, so that a bandwidth of a light wave that is finally output by the second GAF 340 is changed. For example, referring to FIG. 5, $\lambda_4$ is 1550 nm, and a wavelength of the first light wave before the change ranges from 1545 nm to 1554 nm and a bandwidth before the change is 9 nm. The first amplitude is 1 nm. In this case, a wavelength of the first light wave response ranges from 1546 nm to 1555 nm. An overlapping wavelength of the first light wave and the first light wave response ranges from 1546 nm to 1554 nm, and the first target bandwidth is 8 nm. In other words, the bandwidth is changed from 9 nm to 8 nm.

In this embodiment of the present invention, dropping is performed twice by disposing two GAFs. The first GAF 330 performs dropping for the first time to obtain the first light wave, and the second GAF 340 performs dropping for the second time and changes the dropped spectrum of the second GAF 340, to obtain the first light wave response. Therefore, the first light wave and the first light wave response have an overlapping spectral line, and a bandwidth of a light wave that is finally output by the second GAF 340 is changed. Changing a channel bandwidth may greatly improve system flexibility, to adapt to a plurality of service requirements of a system.

Figure 5:
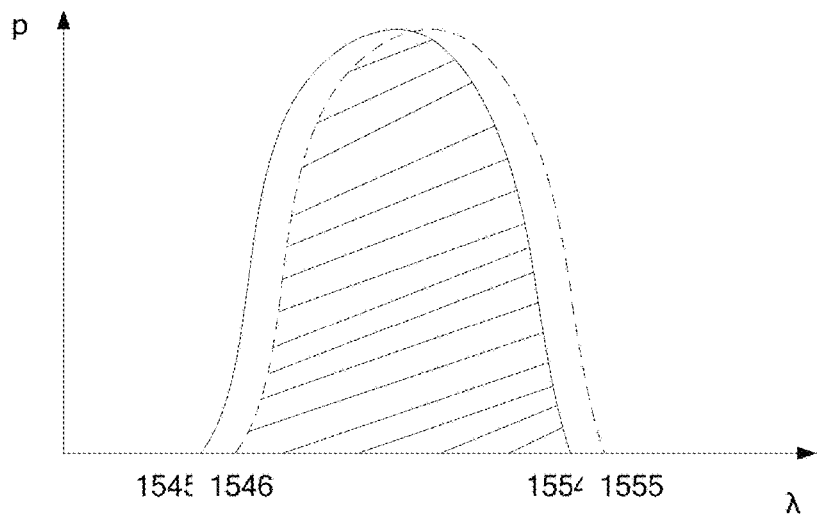
FIG. 5 is a schematic principle diagram of performing bandwidth tuning by a tunable optical add/drop multiplexer unit according to an embodiment of the present invention.

The second GAF 340 transmits a second light wave to the add port of the first GAF 330 through the output port, and the second light wave is a remaining light wave other than the first target light wave in the first light wave. Referring to FIG. 5, a wavelength of the second light wave ranges from 1545 nm to 1546 nm. The output port of the first GAF 330 outputs the second light wave.

The foregoing specifically describes a specific dropping process, and adding is opposite to dropping. The following briefly describes adding. The add port of the second GAF 340 receives a fourth light wave, where the fourth light wave is the same as the first light wave, and the fourth light wave is a light wave whose center wavelength is 1550 nm.

The second GAF 340 transmits the fourth light wave from the output port to the add port of the first GAF 330, and the first wavelength control unit 310 changes an added spectrum of the first GAF 330 based on the first amplitude of wavelength shift, to obtain a fourth light wave response.

The output port of the first GAF 330 outputs a second target light wave of the first target bandwidth, where the first target bandwidth is an overlapping spectral linewidth of the fourth light wave and the fourth light wave response.

It may be understood that the second target light wave, the remaining light wave other than the first target light wave, and $\lambda_1$, $\lambda_2$, $\lambda_3$, $\lambda_5$, $\lambda_6$, $\lambda_7$, and $\lambda_8$ are multiplexed and then output from the output port.

Optionally, referring to FIG. 6 to FIG. 9, FIG. 6 to FIG. 9 are respectively schematic diagrams of four internal optical structures of a T-OADM. The following specifically describes the internal optical structures of the T-OADM.

Figure 6:
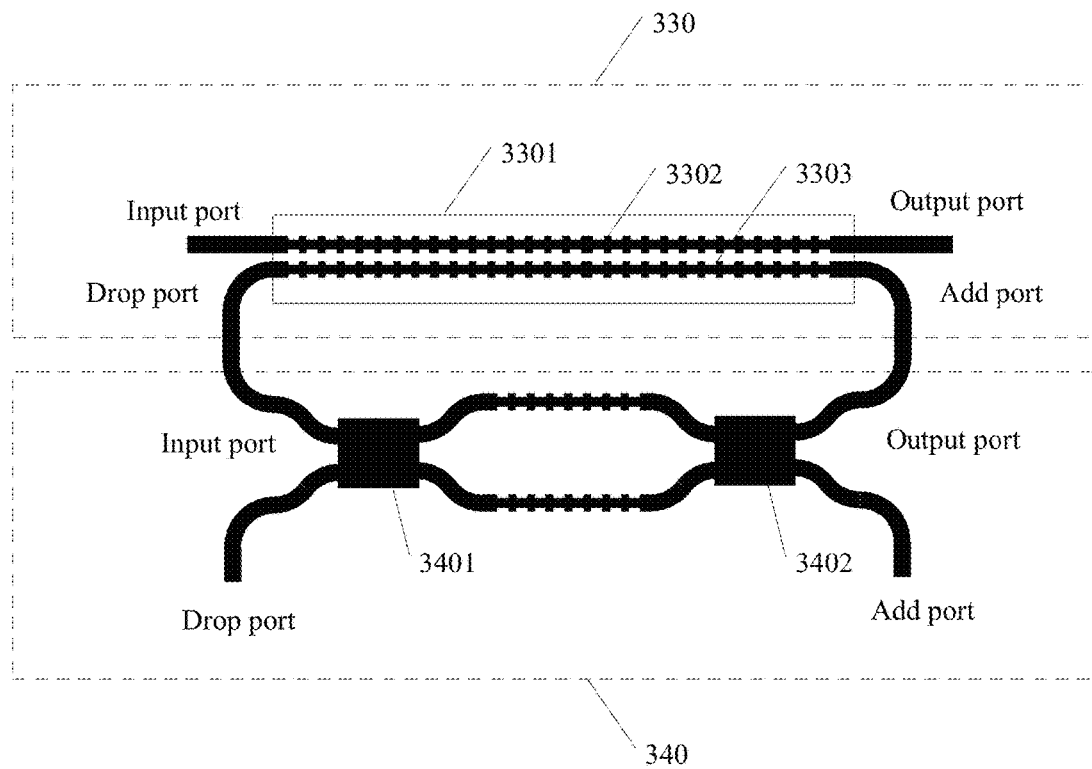
FIG. 6 is a schematic diagram of an internal optical structure of an embodiment of a tunable optical add/drop multiplexer unit according to an embodiment of the present invention.

Optionally, for a first structure, refer to FIG. 6. The first GAF 330 includes a first grating-assisted directional coupler 3301. The first grating-assisted directional coupler 3301 includes two fiber Bragg grating waveguides. A first end of a first fiber Bragg grating waveguide 3302 is the input port of the first GAF, a second end of the first fiber Bragg grating waveguide 3302 is the output port of the first GAF 330, a first end of a second fiber Bragg grating waveguide 3303 is the drop port of the first GAF 330, and a second end of the second fiber Bragg grating waveguide 3303 is the add port of the first GAF 330.

The grating-assisted directional coupler couples, to an adjacent waveguide by using a reflection characteristic of a grating, light that is of a reflection wavelength and that propagates forward, and makes the light propagate backward.

It may be understood that the light waves of a plurality of wavelengths enter the first fiber Bragg grating waveguide 3302 through the first end (the input port of the first GAF) of the first fiber Bragg grating waveguide 3302, and a light wave (for example, a light wave whose center wavelength is $\lambda_4$) that is of a reflection wavelength and that propagates forward is coupled to the second fiber Bragg grating waveguide 3303 due to the reflection characteristic of the grating. The light wave whose center wavelength is $\lambda_4$ is output from the first end of the second fiber Bragg grating waveguide 3303, namely, the drop port of the first GAF 330.

The second GAF 340 includes a third multimode interference coupler 3401 and a fourth multimode interference coupler 3402. The third multimode interference coupler 3401 and the fourth multimode interference coupler 3402 are connected by using two fiber Bragg grating waveguides. A first port of the third multimode interference coupler 3401 is the input port of the second GAF 340, a second port of the third multimode interference coupler 3401 is the drop port of the second GAF 340, a first port of the fourth multimode interference coupler 3402 is the output port of the second GAF 340, and a second port of the fourth multimode interference coupler 3402 is the add port of the second GAF 340.

The drop port of the first GAF 330 is connected to the input port of the second GAF 340, and the output port of the second GAF 340 is connected to the add port of the first GAF 330.

Input light (for example, a light wave whose center wavelength is $\lambda_4$) is divided by the third multimode interference coupler 3401 into two beams of light that have same power and that enter the two fiber Bragg grating waveguides. Light (such as the first light wave response) of a reflection wavelength may propagate in an opposite direction and enter the third multimode interference coupler 3401 again. In this case, the first target light wave is output from the second port (a port at the bottom left). A light wave (the remaining light wave other than the first target light wave in the first light wave) of another wavelength may be output from the first port (a port at the upper right) of the fourth multimode interference coupler 3402 by using a fiber Bragg grating waveguide.

Figure 7:
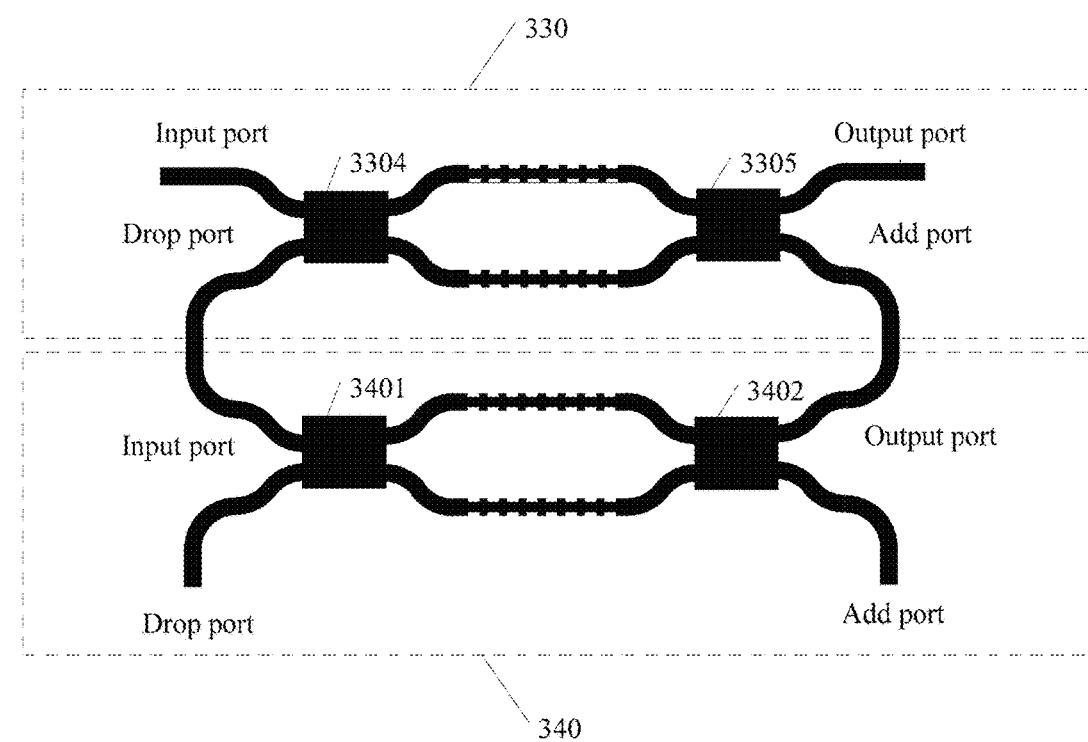
FIG. 7 is a schematic diagram of an internal optical structure of another embodiment of a tunable optical add/drop multiplexer unit according to an embodiment of the present invention.

Optionally, for a second structure, refer to FIG. 7. The first GAF 330 includes a first multimode interference coupler 3304 and a second multimode interference coupler 3305. The first multimode interference coupler 3304 and the second multimode interference coupler 3305 are connected by using two fiber Bragg grating waveguides. A first port of the first multimode interference coupler 3304 is the input port of the first GAF 330, a second port of the first multimode interference coupler 3304 is the drop port of the first GAF 330, a first port of the second multimode interference coupler 3305 is the output port of the first GAF 330, and a second port of the second multimode interference coupler 3305 is the add port of the first GAF 330.

The second GAF 340 includes a third multimode interference coupler 3401 and a fourth multimode interference coupler 3402. The third multimode interference coupler 3401 and the fourth multimode interference coupler 3402 are connected by using two fiber Bragg grating waveguides. A first port of the third multimode interference coupler 3401 is the input port of the second GAF 340, a second port of the third multimode interference coupler 3401 is the drop port of the second GAF 340, a first port of the fourth multimode interference coupler 3402 is the output port of the second GAF 340, and a second port of the fourth multimode interference coupler 3402 is the add port of the second GAF 340.

The drop port of the first GAF 330 is connected to the input port of the second GAF 340, and the output port of the second GAF 340 is connected to the add port of the first GAF 330.

In the structure, for working principles of the first multimode interference coupler 3304, the second multimode interference coupler 3305, the third multimode interference coupler 3401, and the fourth multimode interference coupler 3402, refer to the corresponding third multimode interference coupler 3401 and fourth multimode interference coupler 3402 in FIG. 6. Details are not described herein again.

Figure 8:
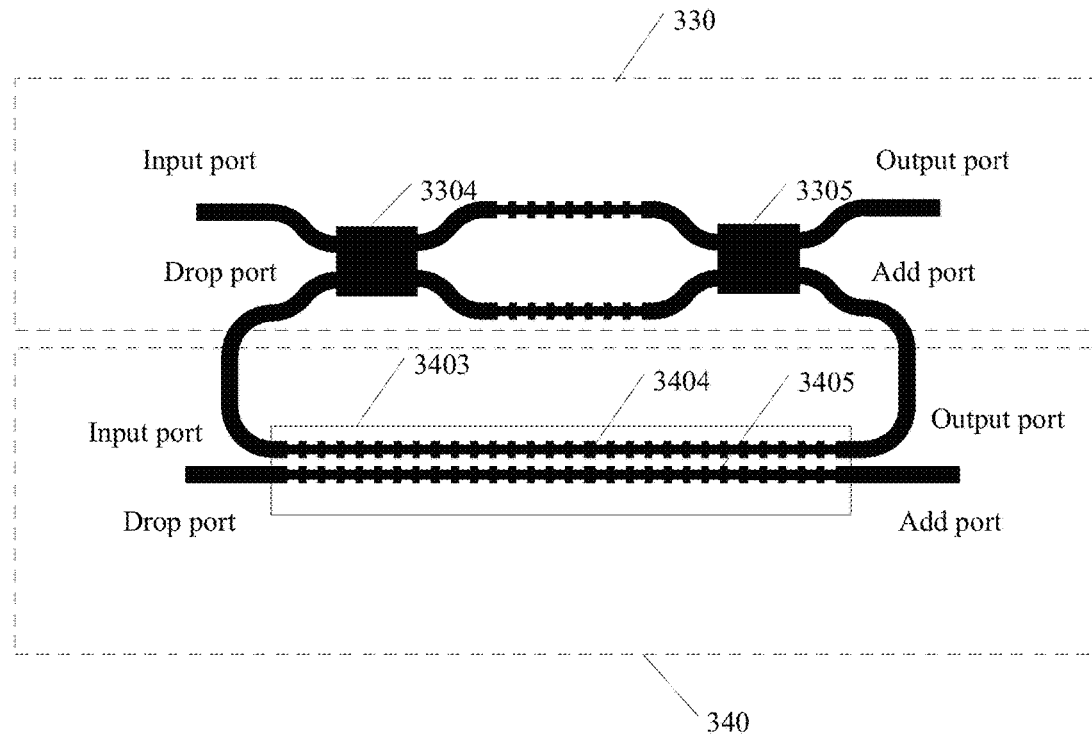
FIG. 8 is a schematic diagram of an internal optical structure of another embodiment of a tunable optical add/drop multiplexer unit according to an embodiment of the present invention.

Optionally, for a third structure, refer to FIG. 8. The first GAF 330 includes a first multimode interference coupler 3304 and a second multimode interference coupler 3305. The first multimode interference coupler 3304 and the second multimode interference coupler 3305 are connected by using two fiber Bragg grating waveguides. A first port of the first multimode interference coupler 3304 is the input port of the first GAF 330, a second port of the first multimode interference coupler 3304 is the drop port of the first GAF 330, a first port of the second multimode interference coupler 3305 is the output port of the first GAF 330, and a second port of the second multimode interference coupler 3305 is the add port of the first GAF 330.

The second GAF 340 includes a second grating-assisted directional coupler 3403. The second grating-assisted directional coupler 3403 includes two fiber Bragg grating waveguides. A first end of a third fiber Bragg grating waveguide 3404 is the input port of the GAF, a second end of the third fiber Bragg grating waveguide 3404 is the output port of the second GAF 340, a first end of a fourth fiber Bragg grating waveguide 3405 is the drop port of the second GAF 340, and a second end of the fourth fiber Bragg grating waveguide 3405 is the add port of the second GAF 340.

The drop port of the first GAF 330 is connected to the input port of the second GAF 340, and the output port of the second GAF 340 is connected to the add port of the first GAF 330.

In the structure, for working principles of the first multimode interference coupler 3304, the second multimode interference coupler 3305, and the second grating-assisted directional coupler 3403, refer to the third multimode interference coupler 3401, the fourth multimode interference coupler 3402, and the first grating-assisted coupler in the corresponding structure in FIG. 6. Details are not described herein again.

Figure 9:
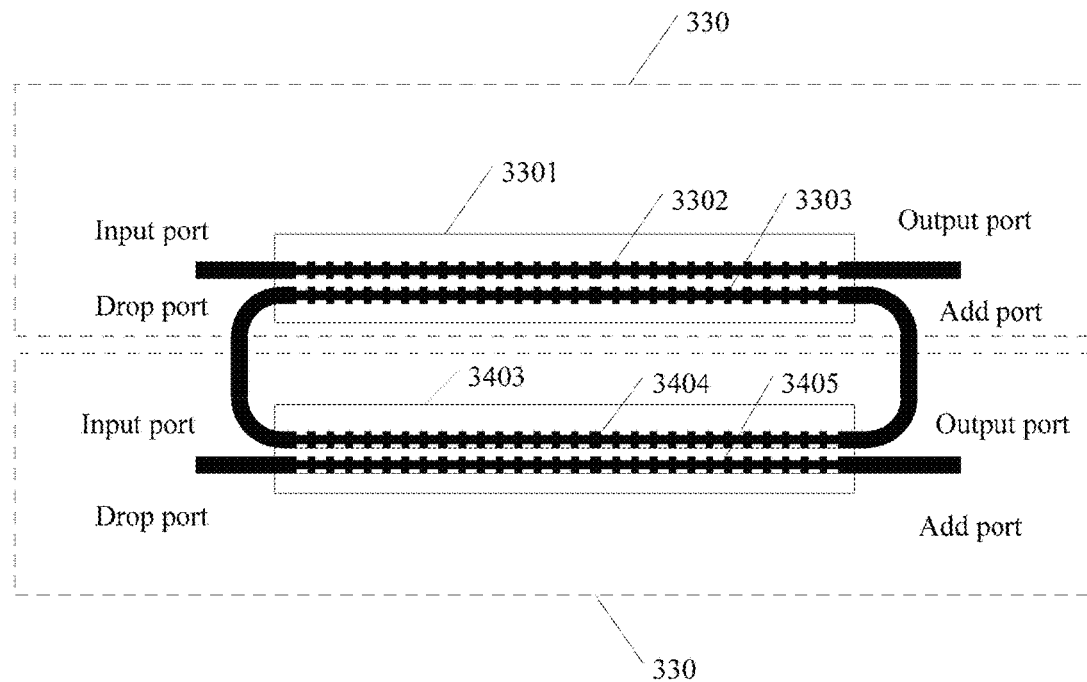
FIG. 9 is a schematic diagram of an internal optical structure of another embodiment of a tunable optical add/drop multiplexer unit according to an embodiment of the present invention.

Preferably, for a fourth structure, refer to FIG. 9. The first GAF 330 includes a first grating-assisted directional coupler 3301. The first grating-assisted directional coupler 3301 includes two fiber Bragg grating waveguides. A first end of a first fiber Bragg grating waveguide 3302 is the input port of the GAF, a second end of the first fiber Bragg grating waveguide 3302 is the output port of the first GAF 330, a first end of a second fiber Bragg grating waveguide is the drop port of the first GAF 330, and a second end of the second fiber Bragg grating waveguide is the add port of the first GAF 330.

The second GAF 340 includes a second grating-assisted directional coupler 3403. The second grating-assisted directional coupler 3403 includes two fiber Bragg grating waveguides. A first end of a third fiber Bragg grating waveguide 3404 is the input port of the GAF, a second end of the third fiber Bragg grating waveguide 3404 is the output port of the second GAF 340, a first end of a fourth fiber Bragg grating waveguide 3405 is the drop port of the second GAF 340, and a second end of the fourth fiber Bragg grating waveguide 3405 is the add port of the second GAF 340.

In the structure, for working principles of the first grating-assisted directional coupler 3301 and the second grating-assisted directional coupler 3403, refer to the first grating-assisted directional coupler 3301 in the corresponding structure in FIG. 6. Details are not described herein again.

The drop port of the first GAF 330 is connected to the input port of the second GAF 340, and the output port of the second GAF 340 is connected to the add port of the first GAF 330.

Optionally, the optical add/drop multiplexer provided in this embodiment of the present invention may further tune a center wavelength of a light wave. Specifically, the first wavelength control unit 310 changes the passband center wavelength of the first GAF 330 based on second amplitude of wavelength shift. It may be understood that a shape of a dropped spectrum of the first GAF 330 is not changed, and only a center wavelength is changed, for example, is changed from $\lambda_4$ to $\lambda_5$.

Dropping is as follows: A center wavelength during dropping performed by the first GAF 330 for the first time is $\lambda_5$, and the second wavelength control unit 320 also changes the dropped spectrum of the second GAF based on the second amplitude of wavelength shift, to change the passband center wavelength of the second GAF 340 to $\lambda_5$. When a light wave whose center wavelength is $\lambda_5$ is transmitted to the input port of the second GAF 340 from the drop port of the first GAF 330, the light wave whose center wavelength is $\lambda_5$ enters the second GAF 340 through the input port of the second GAF 340. The first GAF 330 has a same passband center wavelength as the second GAF 340. In other words, the center wavelengths of both the first GAF 330 and the second GAF 340 are $\lambda_5$. In this case, the light wave whose center wavelength is $\lambda_5$ is output from the drop port of the second GAF 340.

Adding is as follows: A light wave whose length is the same as the passband center wavelength is transmitted to the add port of the first GAF 330 through the output port of the second GAF 340, and is output from the output port of the first GAF 330.

In this embodiment of the present invention, a wavelength control unit controls a passband center wavelength of a GAF, so that passband center wavelengths of two GAFs are the same. A light wave whose length is the same as the passband center wavelengths of the two GAFs is output from the drop port of the second GAF 340, or is output from the output port of the first GAF 330 during adding, so that the center wavelength is tuned, and system flexibility is improved.

Optionally, the optical add/drop multiplexer provided in this embodiment of the present invention may further tune a center wavelength of a light wave, and then tune a bandwidth.

Dropping is used as an example for description below. The first wavelength control unit 310 changes a dropped spectrum of the first GAF 330 based on second amplitude of wavelength shift. For example, the first wavelength control unit 310 changes the passband center wavelength of the first GAF 330 from $\lambda_4$ to $\lambda_5$.

The first GAF 330 transmits a fifth light wave (for example, a light wave whose center wavelength is $\lambda_5$) to the input port of the second GAF 340 through the drop port.

The second wavelength control unit 320 changes the dropped spectrum of the second GAF 340 based on third amplitude of wavelength shift, to obtain a fifth light wave response, where the third amplitude is different from the second amplitude. It may be understood that the third amplitude is a sum of the second amplitude and incremental amplitude. The second wavelength control unit 320 changes the passband center wavelength of the second GAF 340 to $\lambda_5$, and then horizontally moves the spectrum whose center wavelength is $\lambda_5$, to obtain the fifth light wave response, where an offset is the incremental amplitude. This may be understood with reference to bandwidth tuning in the embodiment corresponding to FIG. 3, and details are not described herein. It should be noted that, in actual application, when tuning the passband center wavelength of the second GAF 340, the second wavelength control unit 320 may perform one-time tuning based on the third amplitude, or may perform tuning first based on the second amplitude and then based on the incremental amplitude. A specific implementation is not limited in the present invention.

The drop port of the second GAF 340 outputs a third target light wave of a second target bandwidth, where the second target bandwidth is an overlapping spectral linewidth of the fifth light wave and the fifth light wave response.

Figure 10:
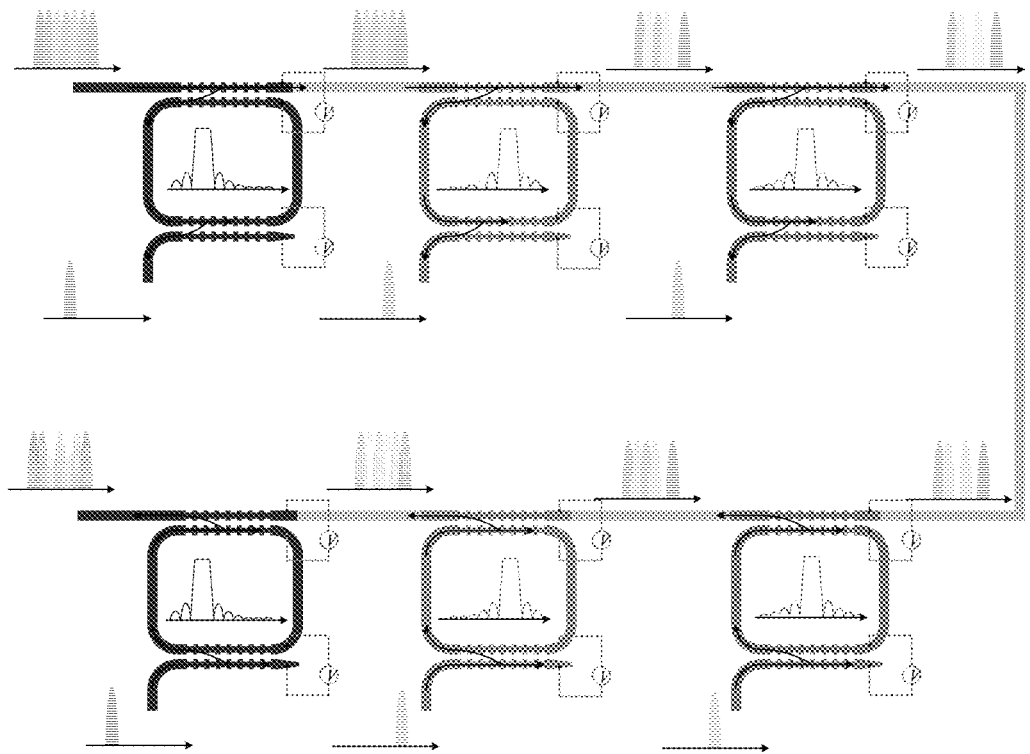
FIG. 10 is a schematic diagram of adding and dropping a series of light waves of fixed bandwidths by an optical add/drop multiplexer according to an embodiment of the present invention.
Figure 11:
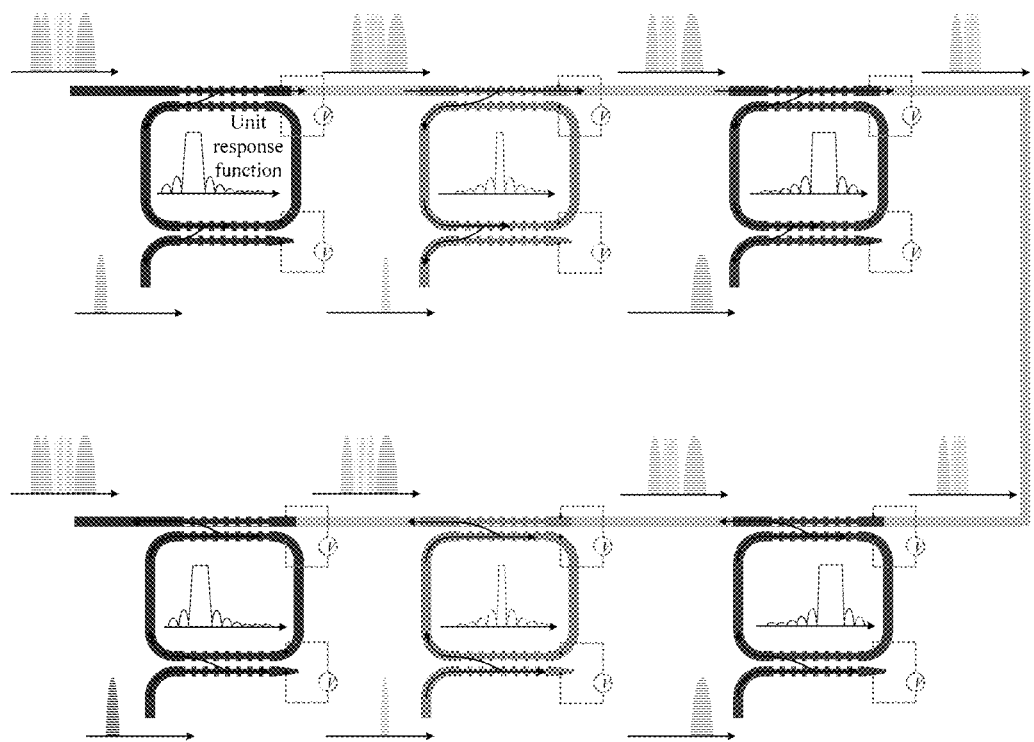
FIG. 11 is a schematic diagram of adding and dropping a series of light waves of flexible bandwidths by an optical add/drop multiplexer according to an embodiment of the present invention.

Referring to FIG. 10 and FIG. 11, FIG. 10 is a schematic diagram of adding and dropping a series of light waves of fixed bandwidths by the optical add/drop multiplexers provided in the embodiments corresponding to FIG. 3 and FIG. 9. FIG. 11 is a schematic diagram of adding and dropping a series of light waves of flexible bandwidths by the optical add/drop multiplexers provided in embodiments corresponding to FIG. 3 and FIG. 9. Due to a simple structure of a T-OADM corresponding to FIG. 9, for the purpose of simple implementation and cost reduction, a T-OADM in FIG. 10 is described by using the structure in FIG. 9 as an example, but is not limited to the structure in FIG. 9. Structures of T-OADMs corresponding to FIG. 6, FIG. 7, and FIG. 8 may also be used for implementation. Light waves of three different wavelengths are used as examples, and an entire link is shown in FIG. 10. The optical add/drop multiplexer provided in this embodiment of the present invention tunes a center wavelength and a bandwidth during adding and dropping. For a specific process, refer to FIG. 3 to FIG. 5. The foregoing specifically describes the process of bandwidth tuning and center wavelength tuning, and details are not described herein.

The foregoing specifically describes the optical add/drop multiplexer, and the following describes a control method for the optical add/drop multiplexer. The control method is applied to the optical add/drop multiplexers in the embodiments corresponding to FIG. 3 to FIG. 9. For a structure of the optical add/drop multiplexer, details are not described herein again.

The control method includes the following steps:

An input port of a first GAF of a first T-OADM receives light waves of a plurality of wavelengths, where the light waves of a plurality of wavelengths include a first light wave.

The first GAF transmits the first light wave to an input port of a second GAF through a drop port.

A second wavelength control unit changes a dropped spectrum of the second GAF based on target amplitude of wavelength shift, to obtain a first light wave response.

A drop port of the second GAF outputs a first target light wave of a first target bandwidth, where the first target bandwidth is an overlapping spectral linewidth of the first light wave and the first light wave response.

Optionally, after the drop port of the second GAF outputs the target light wave of the target bandwidth, the method further includes the following steps:

The second GAF transmits a second light wave to an add port of the first GAF through the output port, where the second light wave is a remaining light wave other than the first target light wave in the first light wave.

An output port of the first GAF outputs the second light wave.

Optionally, after the drop port of the second GAF outputs the target light wave of the target bandwidth, the method further includes tuning a bandwidth of an added light wave, and this specifically includes the following steps:

An add port of the second GAF receives a fourth light wave, where the fourth light wave is the same as the first light wave.

The second GAF transmits the fourth light wave from the output port to the add port of the first GAF.

A first wavelength control unit changes an added spectrum of the first GAF based on target amplitude of wavelength shift, to obtain a fourth light wave response.

The output port of the first GAF outputs a second target light wave of the first target bandwidth, where the first target bandwidth is an overlapping spectral linewidth of the fourth light wave and the fourth light wave response.

Optionally, for tuning a center wavelength during adding/dropping, the method further specifically includes the following steps:

A first wavelength control unit and the second wavelength control unit each change dropped spectrums of their corresponding GAFs based on second amplitude of wavelength shift, where a passband center wavelength of the first GAF is the same as a passband center wavelength of the second GAF.

A light wave whose length is the same as the passband center wavelength is transmitted to the input port of the second GAF through the drop port of the first GAF, and is output from the drop port of the second GAF.

Alternatively, a light wave whose length is the same as the passband center wavelength is transmitted to an add port of the first GAF through an output port of the second GAF, and is output from an output port of the first GAF.

Optionally, this embodiment of the present invention further provides another embodiment of the control method for an optical add/drop multiplexer. In this embodiment, wavelength tuning may be performed before bandwidth tuning. The embodiment specifically includes the following steps:

A first wavelength control unit changes a dropped spectrum of the first GAF based on second amplitude of wavelength shift.

The first GAF transmits a fifth light wave to the input port of the second GAF through the drop port.

The second wavelength control unit changes the dropped spectrum of the second GAF based on third amplitude of wavelength shift, to obtain a fifth light wave response, where the third amplitude is different from the second amplitude.

The drop port of the second GAF outputs a third target light wave of a second target bandwidth, where the second target bandwidth is an overlapping spectral linewidth of the fifth light wave and the fifth light wave response.

Figure 12:
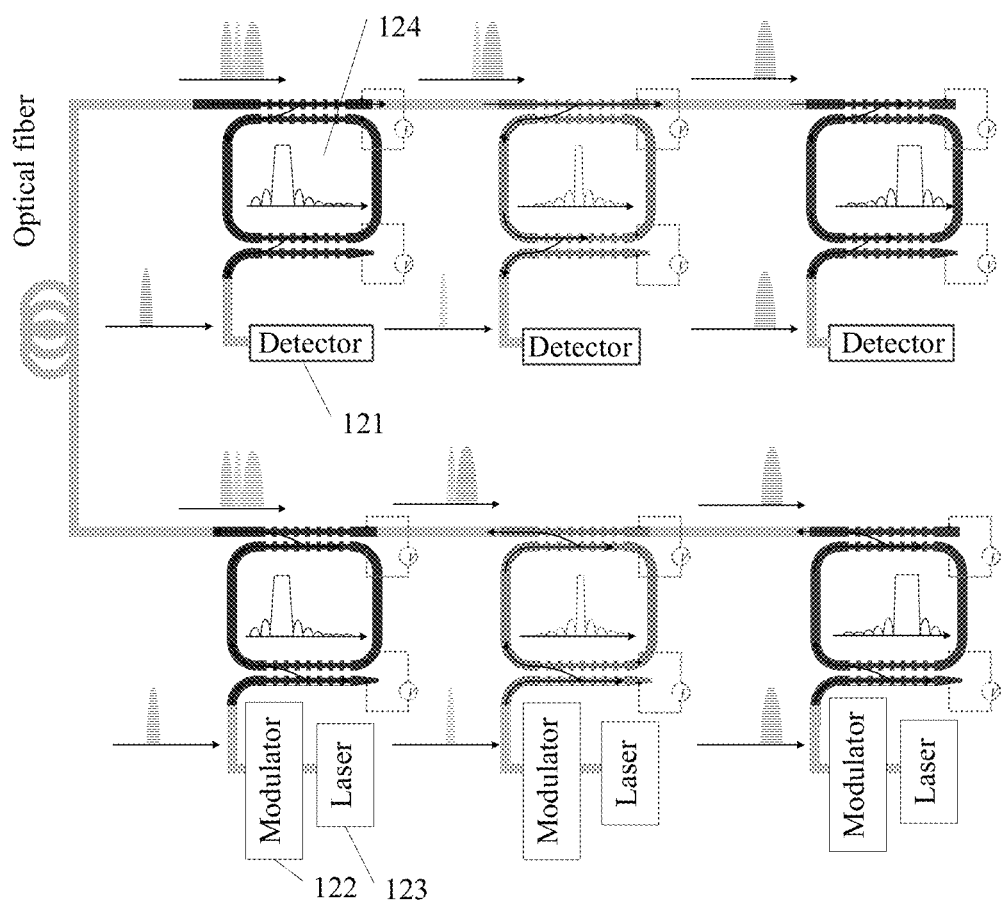
FIG. 12 is a schematic structural diagram of a transceiver according to an embodiment of the present invention.

Referring to FIG. 12, an embodiment of the present invention further provides a transceiver, and an embodiment of the transceiver includes:

at least one laser 121, at least one modulator 122, at least one detector 123, and an optical add/drop multiplexer. A link having three T-OADMs 124 is used as an example for description in FIG. 12. All the T-OADMs 124 have a same structure, and a structure of one T-OADM 124 is used as an example for description. At a transmit end, the laser 121 is connected to the modulator 122, and the modulator 122 is connected to an add port of a T-OADM 124 having a corresponding wavelength. Light waves that have different bandwidths and are generated by the modulator 122 may be multiplexed into one channel by using the T-OADM 124 having the corresponding bandwidth. At a receive end, the detector 123 is connected to a drop port of the T-OADM 124. Light waves of a plurality of wavelengths may be demultiplexed by using the T-OADM 124 having the corresponding bandwidth, and finally received by the detector 123.

The transceiver in this embodiment of the present invention uses a T-OADM having a tunable bandwidth as a multiplexer and a demultiplexer of the transceiver, so that a multi-channel transceiver having a tunable bandwidth can perform multiplexing and demultiplexing. Therefore, system flexibility is improved, and a system is applicable to a dynamic network.

It may be clearly understood by persons skilled in the art that, for the purpose of convenient and brief description, for a detailed working process of the foregoing transceiver and the control method for an optical add/drop multiplexer, refer to a corresponding process in the foregoing optical add/drop multiplexer embodiments, and details are not described herein again.

In the several embodiments provided in this application, it should be understood that the disclosed system, apparatus, and method may be implemented in other manners. For example, the foregoing described apparatus embodiment is merely an example. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An optical add/drop multiplexer, comprising a plurality of tunable optical add/drop multiplexers (T-OADMs), wherein:
   the plurality of T-OADMs are connected one by one;
   each T-OADM comprises a second wavelength control unit and two grating-assisted filters (GAFs);
   the second wavelength control unit is connected to a second GAF;
   a first GAF comprises an input port, an output port, a drop port, and an add port;
   the second GAF comprises an input port, an output port, a drop port, and an add port;
   the drop port of the first GAF is connected to the input port of the second GAF, and the add port of the first GAF is connected to the output port of the second GAF;
   the input port of the first GAF of a first T-OADM receives light waves of a plurality of wavelengths, wherein the light waves of the plurality of wavelengths comprise a first light wave;
   the first GAF transmits the first light wave to the input port of the second GAF through the drop port of the first GAF;
   the second wavelength control unit changes a dropped spectrum of the second GAF based on first amplitude of wavelength shift, to obtain a first light wave response; and
   the drop port of the second GAF outputs a first target light wave of a first target bandwidth, wherein the first target bandwidth is an overlapping spectral linewidth of the first light wave and the first light wave response.

2. The optical add/drop multiplexer according to claim 1, wherein
   the second GAF transmits a second light wave to the add port of the first GAF through the output port, wherein the second light wave is a remaining light wave other than the first target light wave in the first light wave; and
   the output port of the first GAF outputs the second light wave.

3. The optical add/drop multiplexer according to claim 2, wherein the add port of the second GAF receives a fourth light wave, wherein the fourth light wave is the same as the first light wave;
   the second GAF transmits the fourth light wave from the output port to the add port of the first GAF;
   a first wavelength control unit changes an added spectrum of the first GAF based on the first amplitude of wavelength shift, to obtain a fourth light wave response; and
   the output port of the first GAF outputs a second target light wave of the first target bandwidth, wherein the first target bandwidth is an overlapping spectral linewidth of the fourth light wave and the fourth light wave response.

4. The optical add/drop multiplexer according to claim 1, wherein the T-OADM further comprises a first wavelength control unit, and the first wavelength control unit is connected to the first GAF;
   the first wavelength control unit and the second wavelength control unit each change dropped spectrums of their corresponding GAFs based on second amplitude of wavelength shift, to tune a passband center wavelength, wherein a passband center wavelength of the first GAF is the same as a passband center wavelength of the second GAF; and
   a light wave whose length is the same as the passband center wavelength is transmitted to the input port of the second GAF through the drop port of the first GAF, and is output from the drop port of the second GAF; or
   a light wave whose length is the same as the passband center wavelength is transmitted to the add port of the first GAF through the output port of the second GAF, and is output from the output port of the first GAF.

5. The optical add/drop multiplexer according to claim 1, wherein the T-OADM comprises a first wavelength control unit, and the first wavelength control unit is connected to the first GAF;
   the first wavelength control unit changes a dropped spectrum of the first GAF based on second amplitude of wavelength shift;

the first GAF transmits a fifth light wave to the input port of the second GAF through the drop port, wherein the light waves of a plurality of wavelengths comprise the fifth light wave;

the second wavelength control unit changes the dropped spectrum of the second GAF based on third amplitude of wavelength shift, to obtain a fifth light wave response, wherein the third amplitude is different from the second amplitude; and the drop port of the second GAF outputs a third target light wave of a second target bandwidth, wherein the second target bandwidth is an overlapping spectral linewidth of the fifth light wave and the fifth light wave response.

6. The optical add/drop multiplexer according to claim 1, wherein the first GAF comprises a first grating-assisted directional coupler, the first grating-assisted directional coupler comprises two fiber Bragg grating waveguides, a first end of a first fiber Bragg grating waveguide is the input port of the first GAF, a second end of the first fiber Bragg grating waveguide is the output port of the first GAF, a first end of a second fiber Bragg grating waveguide is the drop port of the first GAF, and a second end of the second fiber Bragg grating waveguide is the add port of the first GAF; or the first GAF comprises a first multimode interference coupler and a second multimode interference coupler, the first multimode interference coupler and the second multimode interference coupler are connected by using two fiber Bragg grating waveguides, a first port of the first multimode interference coupler is the input port of the first GAF, a second port of the first multimode interference coupler is the drop port of the first GAF, a first port of the second multimode interference coupler is the output port of the first GAF, and a second port of the second multimode interference coupler is the add port of the first GAF.

7. The optical add/drop multiplexer according to claim 6, wherein the second GAF comprises a third multimode interference coupler and a fourth multimode interference coupler, the third multimode interference coupler and the fourth multimode interference coupler are connected by using two fiber Bragg grating waveguides, a first port of the third multimode interference coupler is the input port of the second GAF, a second port of the third multimode interference coupler is the drop port of the second GAF, a first port of the fourth multimode interference coupler is the output port of the second GAF, and a second port of the fourth multimode interference coupler is the add port of the second GAF; or the second GAF comprises a second grating-assisted directional coupler, the second grating-assisted directional coupler comprises two fiber Bragg grating waveguides, a first end of a third fiber Bragg grating waveguide is the input port of the second GAF, a second end of the third fiber Bragg grating waveguide is the output port of the second GAF, a first end of a fourth fiber Bragg grating waveguide is the drop port of the second GAF, and a second end of the fourth fiber Bragg grating waveguide is the add port of the second GAF.

8. A control method for an optical add/drop multiplexer, wherein the control method is applied to an optical add/drop multiplexer, the optical add/drop multiplexer comprises a plurality of tunable optical add/drop multiplexers (T-OADMs), the plurality of T-OADMs are connected one by one, each T-OADM comprises two wavelength control units and two grating-assisted filters (GAFs), a first wavelength control unit is connected to a first GAF, a second wavelength control unit is connected to a second GAF, a drop port of the first GAF is connected to an input port of the second GAF, and an add port of the first GAF is connected to an output port of the second GAF; and the control method comprises:

receiving, by an input port of the first GAF of a first T-OADM, light waves of a plurality of wavelengths, wherein the light waves of the plurality of wavelengths comprise a first light wave;

transmitting, by the first GAF, the first light wave to the input port of the second GAF through the drop port;

changing, by the second wavelength control unit, a dropped spectrum of the second GAF based on target amplitude of wavelength shift, to obtain a first light wave response; and outputting, by a drop port of the second GAF, a first target light wave of a first target bandwidth, wherein the first target bandwidth is an overlapping spectral linewidth of the first light wave and the first light wave response.

9. The control method according to claim 8, wherein after the outputting, by a drop port of the second GAF, a first target light wave of a first target bandwidth, the method further comprises:

transmitting, by the second GAF, a second light wave to the add port of the first GAF through the output port, wherein the second light wave is a remaining light wave other than the first target light wave in the first light wave; and outputting, by an output port of the first GAF, the second light wave.

10. The control method according to claim 8, wherein after the outputting, by a drop port of the second GAF, a target light wave of a target bandwidth, the method further comprises:

receiving, by an add port of the second GAF, a fourth light wave, wherein the fourth light wave is the same as the first light wave;

transmitting, by the second GAF, the fourth light wave from the output port to the add port of the first GAF;

changing, by the first wavelength control unit, an added spectrum of the first GAF based on the target amplitude of wavelength shift, to obtain a fourth light wave response; and outputting, by the output port of the first GAF, a second target light wave of the first target bandwidth, wherein the first target bandwidth is an overlapping spectral linewidth of the fourth light wave and the fourth light wave response.

11. The control method according to claim 8, wherein the method further comprises:

each changing, by the first wavelength control unit and the second wavelength control unit, dropped spectrums of their corresponding GAFs based on second amplitude of wavelength shift, wherein a passband center wavelength of the first GAF is the same as a passband center wavelength of the second GAF; and transmitting a light wave whose length is the same as the passband center wavelength to the input port of the second GAF through the drop port of the first GAF, and outputting the light wave from the drop port of the second GAF; or transmitting a light wave whose length is the same as the passband center wavelength to the add port of the first GAF through the output port of the second GAF, and outputting the light wave from an output port of the first GAF.

12. The control method according to claim 8, wherein the light waves of a plurality of wavelengths comprise a fifth light wave, and the method further comprises:
- changing, by the first wavelength control unit, a dropped spectrum of the first GAF based on second amplitude of wavelength shift;
- transmitting, by the first GAF, the fifth light wave to the input port of the second GAF through the drop port;
- changing, by the second wavelength control unit, the dropped spectrum of the second GAF based on third amplitude of wavelength shift, to obtain a fifth light wave response, wherein the third amplitude is different from the second amplitude; and
- outputting, by the drop port of the second GAF, a third target light wave of a second target bandwidth, wherein the second target bandwidth is an overlapping spectral linewidth of the fifth light wave and the fifth light wave response.

13. A transceiver, comprising:
- at least one laser, at least one modulator, at least one detector, and an optical add/drop multiplexer, the optical add/drop multiplexer comprising a plurality of tunable optical add/drop multiplexers (T-OADMs), wherein the plurality of T-OADMs are connected one by one, each T-OADM comprises a second wavelength control unit and two grating-assisted filters (GAFs), and the second wavelength control unit is connected to a second GAF;
- a first GAF comprises an input port, an output port, a drop port, and an add port;
- the second GAF comprises an input port, an output port, a drop port, and an add port;
- the drop port of the first GAF is connected to the input port of the second GAF, and the add port of the first GAF is connected to the output port of the second GAF;
- the input port of the first GAF of a first T-OADM receives light waves of a plurality of wavelengths, wherein the light waves of the plurality of wavelengths comprise a first light wave;
- the first GAF transmits the first light wave to the input port of the second GAF through the drop port of the first GAF;
- the second wavelength control unit changes a dropped spectrum of the second GAF based on first amplitude of wavelength shift, to obtain a first light wave response; and
- the drop port of the second GAF outputs a first target light wave of a first target bandwidth, wherein the first target bandwidth is an overlapping spectral linewidth of the first light wave and the first light wave response; wherein the laser is connected to the modulator, the modulator is connected to an add port of the optical add/drop multiplexer, and the detector is connected to a drop port of the optical add/drop multiplexer.

* * * * *